United States Patent [19]

Harris et al.

[11] Patent Number: 5,580,950
[45] Date of Patent: Dec. 3, 1996

[54] NEGATIVE BIREFRINGENT RIGID ROD POLYMER FILMS

[75] Inventors: Frank W. Harris; Stephen Z. D. Cheng, both of Akron, Ohio

[73] Assignee: The University of Akron, Akron, Ohio

[21] Appl. No.: 322,314

[22] Filed: Oct. 13, 1994

Related U.S. Application Data

[63] Continuation-in-part of Ser. No. 230,729, Apr. 21, 1994, Pat. No. 5,489,964, which is a continuation-in-part of Ser. No. 72,137, Jun. 19, 1993, Pat. No. 5,344,916, and a continuation-in-part of Ser. No. 51,068, Apr. 21, 1993, abandoned.

[51] Int. Cl.$^6$ .................................................. C08G 73/10
[52] U.S. Cl. ................... 528/350; 528/125; 528/128; 528/170; 528/172; 528/173; 528/174; 528/176; 528/183; 528/185; 528/220; 528/229; 528/272; 528/288; 528/331; 528/335; 528/345; 528/348; 528/353; 428/473.5; 428/474.4
[58] Field of Search ........................... 528/331, 345, 528/289, 348, 335, 272, 350, 288, 353, 170, 172, 173, 174, 176, 183, 185, 125, 128; 428/473.5, 474.4

[56] References Cited

U.S. PATENT DOCUMENTS

| | | | |
|---|---|---|---|
| 4,307,226 | 12/1981 | Bolon et al. | 528/288 |
| 4,362,861 | 12/1982 | Shen | 528/289 |
| 4,478,913 | 10/1984 | Pauzé | 428/383 |
| 4,861,857 | 8/1989 | Kricheldorf et al. | 528/170 |
| 5,071,997 | 12/1991 | Harris | 528/353 |
| 5,128,782 | 7/1992 | Wood | 309/48 |
| 5,130,827 | 7/1992 | Pavone et al. | 359/69 |
| 5,138,474 | 8/1992 | Arakawa | 359/73 |
| 5,196,953 | 3/1993 | Yeh et al. | 359/73 |
| 5,296,610 | 3/1994 | Wolf et al. | 548/406 |
| 5,310,856 | 5/1994 | Li . | |
| 5,321,097 | 6/1994 | Kawaki et al. | 525/424 |
| 5,344,916 | 9/1994 | Harris et al. | 528/353 |

OTHER PUBLICATIONS

Harris, Seymour, entitled "Structure–Solubility Relationships in Polymers", Am. Chem. Soc. San Fran. Aug. 30–Sep. 3, 1976, pp. 183–214.

Rogers, Gaudiana, Hollinsed, Kalyanaraman, Manello, McGowan, Minns, Sahatjian, titled "Highly Amorphous, Birefringent, Para–Linked Aromatic Polyamides", Macromolecules, (Jul. 1985)18, 1058–68.

Gaudiana, Minns, Rogers, Sinta, Taylor, Kalayanaraman, McGowan, titled "Molecular Factors Affecting Solubility in Rigid–Rod Polyamides", J. Poly. Sci., (May 30, 1986)25, 1249–71.

Rogers, Gaudiana, Minns, Spero, titled "Consequences of Chemical Modification on Optical and Solution Properties of Rodlike Polyamides", J. Macromol. Sci. Chem., (May 1986), A23(7), 905–14.

Primary Examiner—James J. Seidleck
Assistant Examiner—P. Hampton Hightower
Attorney, Agent, or Firm—Oldham & Oldham Co., L.P.A.

[57] ABSTRACT

A class of soluble polymers having a rigid rod backbone, which when used to cast films, undergo a self-orientation process whereby the polymer backbone becomes more or less aligned parallel to the film surface. This in-plane orientation results in a film that displays negative birefringence. The degree of in-plane orientation and thus, the magnitude of the negative birefringence is controlled by varying the backbone linearity and rigidity of the class of polymers which includes polyesters, polyamides, poly(amide-imides) and poly(ester-imides) through selection of substituents in the polymer backbone chain. By increasing the polymer backbone linearity and rigidity, the degree of in-plane orientation and associated negative birefringence can be increased, and that conversely, by decreasing the polymer backbone linearity and rigidity, the negative birefringence can be decreased.

9 Claims, 4 Drawing Sheets

Y = YELLOW
R = RED
B = BLACK
G = GREEN

FIG.-8

NEGATIVE BIREFRINGENT RIGID ROD POLYMER FILMS

This invention was made with Government support under DMR 91-57738 and DMR 89-20147 awarded by the National Science Foundation. The Government has certain rights in this invention.

This is a continuation-in-part of application Ser. No. 08/230,729 filed on Apr. 21, 1994 which is U.S. Pat. No. 5,480,964 and is a Continuation-in-Part of Ser. No. 08/072,137 filed on Jun. 4, 1993 which is U.S. Pat. No. 5,344,916 and is a Continuation-in-Part of Ser. No. 08/051,068 filed on Apr. 21, 1993 which has been abandoned.

TECHNICAL FIELD

The invention described herein pertains generally to negative birefringent polymer films having a rigid rod backbone for use in a compensator layer in a liquid crystal display.

BACKGROUND OF THE INVENTION

Liquid crystals are useful for electronic displays because light travelling through a thin film of liquid crystal is affected by the birefringence of the film, which can be controlled by the application of a voltage across the film. Liquid crystal displays are desirable because the transmission or reflection of light from an external source, including ambient light, can be controlled with much less power than is required for luminescent materials used in other displays. Liquid crystal displays are now commonly used in such applications as digital watches, calculators, portable computers, and many other types of electronic equipment where the need exists for long-lived operation, with very low voltage and low power consumption. In particular, portable computer displays benefit from liquid crystal displays where display power utilization must be minimized to permit the battery to operate for as long a period of time as possible before recharging, while allowing the majority of the battery utilization to be directed toward computational efforts.

When viewed directly, a liquid crystal display provides a high quality output. However, at large viewing angles, the image degrades and exhibits poor contrast. This occurs because liquid crystal cells operate by virtue of the birefringent effect exhibited by a liquid crystal medium which includes a large number of anisotropic liquid crystal molecules. Such a material will be positively uniaxially birefringent ($n_\perp > n_\parallel$ i.e., the extraordinary refractive index is larger than the ordinary refractive index) with the extraordinary refractive index associated with the alignment of the long molecular axes. The phase retardation effect of such a material on light passing through it inherently varies with the inclination angle of the light, leading to a lower quality image at large viewing angles. By introducing an optical compensating element in conjunction with the liquid crystal cell, however, it is possible to correct for the unwanted angular effects and thereby maintain higher contrast at larger viewing angles than otherwise possible.

The type of optical compensation required depends on the type of display which is used. In a normally black display, the twisted nematic cell is placed between polarizers whose transmission axes are parallel to one another and to the orientation of the director of the liquid crystal at the rear of the cell (i.e., the side of the cell away from the viewer). In the unenergized state, no applied voltage, normally incident light from the backlight is polarized by the first polarizer and in passing through the cell, has its polarization direction rotated by the twist angle of the cell. The twist angle is set to 90° so that the light is blocked by the output polarizer. Patterns can be written in the display by selectively applying a voltage to the portions of the display which are to appear illuminated.

However, when viewed at large angles, the dark (unenergized) areas of a normally black display will appear light because of angle dependent retardation effects for light passing through the liquid crystal layer at such angles, i.e., off-normal incidence light senses an angle-dependent change of polarization. Contrast can be restored by using a compensating element which has an optical symmetry similar to that of the twist cell, but which reverses its effect. One method is to follow the active liquid crystal layer with a twist cell of reverse helicity. Another is to use one or more A-plate retarder compensators. These compensation methods work because the compensation element shares an optical symmetry with the twisted nematic cell; both are uniaxial birefringent materials having an extraordinary axis orthogonal to the normal light propagation direction. These approaches to compensation have been widely utilized because of the ready availability of materials with the required optical symmetry. Reverse twist cells employ liquid crystals and A-plate retarders are readily manufactured by the stretching of polymers such as polyvinyl alcohol.

Despite the effectiveness of these compensation techniques, there are drawbacks to this approach associated with the normally black operational mode. The appearance of a normally black display is very sensitive to cell gap. Consequently, in order to maintain a uniform dark appearance, it is necessary to make the liquid crystal cell very thick, which results in unacceptably long liquid crystal response times. In addition, the reverse twist compensation technique requires the insertion of a second liquid crystal cell into the optical train, adding significant cost, weight, and bulk to the display. For these reasons, it is highly desirable to compensate a normally white display in order to avoid these disadvantages.

In a normally white display configuration, the 90° twisted nematic cell is placed between polarizers which are crossed, such that the transmission axis of each polarizer is parallel to the director orientation of the liquid crystal molecules in the region of the cell adjacent to it. This reverses the sense of light and dark from that of the normally black display. The unenergized (no applied voltage) areas appear light in a normally white display, while those which are energized appear dark. The problem of ostensibly dark areas appearing light when viewed at large angles still occurs, but the reason for it is different and its correction requires a different type of optical compensating element. In the energized areas, the liquid crystal molecules tend to align with the applied electric field. If this alignment were perfect, all the liquid crystal molecules in the cell would have their long axes normal to the substrate glass. This arrangement, known as homeotropic configuration, exhibits the optical symmetry of a positively birefringent C-plate. In the energized state, the normally white display appears isotropic to normally incident light, which is blocked by the crossed polarizers.

The loss of contrast with viewing angle occurs because the homeotropic liquid crystal layer does not appear isotropic to off-normal light. Light directed at off normal angles propagates in two modes due to the birefringence of the layer, with a phase delay between those modes which increases with the incident angle of the light. This phase dependence on incidence angle introduces an ellipticity to the polarization state which is then incompletely extinguished by the second polarizer, giving rise to slight leakage.

Because of the C-plate symmetry, the birefringence has no azimuthal dependence. Clearly what is needed is an optical compensating element, also in C-plane symmetry, but with negative ($n_{||} > n_{\perp}$) birefringence. Such a compensator would introduces a phase delay opposite in sign to that caused by the liquid crystal layer, thereby restoring the original polarization state, allowing the light to be blocked by the output polarizer.

This technique has not been used in the past because it has been difficult or impossible to construct a C-plate compensator with the required optical symmetry. There has been no way found to stretch or compress polymers to obtain large area films with negative C-plate optical symmetry and the required uniformity, nor is it possible to for a compensator from a negatively birefringent crystal such as sapphire. In order for a compensator to be effective, the phase retardation of such a plate would have to have the same magnitude as the phase retardation of the liquid crystal and would also have to have the same magnitude as the phase retardation of the liquid crystal and would also have to change with the viewing angle at the same rate as the change of the liquid crystal's phase retardation. These constraints imply that the thickness of the negative plate would thus be on the order of 10 µm, making such an approach very difficult to accomplish because it would require the polishing of an extremely thin plate having the correct (negative) birefringence while ensuring that the surfaces of the plate remained parallel. Since such displays are relatively large in size, the availability of a negatively birefringent crystal of sufficient size would also be a major difficulty. Compensation techniques have been proposed which utilize crossed A-plate compensators. Such an arrangement, however, cannot produce a compensator with an azimuthal (C-plate) symmetry. Because of these difficulties, the tendency in the art has been to rely on normally black displays, even though the normally white type could produce a superior quality display if an appropriate compensator were available.

Previous attempts at compensator fabrication are described, for example in U.S. Pat. No. 5,138,474, to Fuji Photo Film Co., Ltd., and wherein the technique relied upon for imparting negative birefringence required film stretching. Compensators are designed to improve the viewing angle dependence which is a function of retardation (Re), defined as a product of a birefringence (Δn) of a film and a film thickness (d). The viewing angle is improved by inserting a film having an optic axis substantially in the normal direction, more specifically, a laminated film of a biaxially stretched film having a negative intrinsic birefringence and a uniaxially stretched film having a positive intrinsic birefringence between a liquid crystal cell and a polarizing sheet. Preferred examples of polymers for use in preparing the stretched films having a positive intrinsic birefringence include polycarbonates, polyarylates, polyethylene terephthalate, polyether sulfone, polyphenylene sulfide, polyphenylene oxide, polyallyl sulfone, polyamide-imides, polyimides, polyolefins, polyvinyl chloride, cellulose and polyarylates and polyesters which have a high intrinsic birefringence prepared by for example, solution casting.

Preferred examples of negative intrinsic birefringence stretched films would include styrene polymers, acrylic ester polymers, methacrylic ester polymers, acrylonitrile polymers and methacrylonitrile polymers with polystyrene polymers being most preferred from the viewpoint of large absolute value of intrinsic birefringence, transparency and ease of processing into films by solution casting.

However, to date, there still is lacking a method for producing negative intrinsic birefringence films without the need of having to resort to physical polymer film stretching to introduce the necessary orientation. Physical drawing of polymer films to achieve the necessary orientation and ordered areas which increase the scattering of light, are difficult to achieve, particularly regarding film uniformity. While on a macroscopic level the films superficially appear to be uniform, this is not the case on a microscopic level. To date, there has been no self-orienting, inherently in-plane oriented negative intrinsic birefringence films which are uniform on a microscopic level.

SUMMARY OF THE INVENTION

In accordance with the present invention, there is provided a novel class of soluble polymers having a rigid rod backbone, which when used to cast films, undergo a self-orientation process whereby the polymer backbone becomes more or less aligned parallel to the film surface. This in-plane orientation results in a film that displays negative birefringence.

It is another object of this invention to teach the ability to control the degree of in-plane orientation and thus, the magnitude of the negative birefringence by varying the backbone linearity and rigidity of polyesters, polyamides, poly(amide-imides) and poly(ester-imides).

It is yet another object of this invention to teach that by increasing the polymer backbone linearity and rigidity, the degree of in-plane orientation and associated negative birefringence can be increased, and that conversely, by decreasing the polymer backbone linearity and rigidity, the negative birefringence can be decreased.

It is still another object of this invention to teach the preparation of thin polymer films that display negative birefringence in excess of 0.2.

It is yet still another object of this invention to teach the preparation of thin polymer films that are essentially non-birefringent.

It is another object of this invention to teach the ability to control the magnitude of the negative birefringence of thin polymer films between zero and values in excess of 0.2 by adjusting the backbone linearity and rigidity of polyesters, polyamides, poly(amide-imides) and poly(ester-imides).

It is an object of this invention to provide homopolymers and copolymers which are soluble in non-toxic organic solvents, preferably mixed solvents of ketones and ethers, which are capable of forming thin films, e.g., by spin coating, which exhibit negative birefringence.

These and other objects of this invention will be evident when viewed in light of the drawings, detailed description and appended claims.

DETAILED DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

The rigid rod polymers of this invention are selected from the class which consists of polyamides, polyesters, polyesterimides and polyamideimides, and copolymers thereof. Specifically, the repeating unit of the polyamides and polyesters can be shown to be of general formula (I):

where each

F is selected from the group consisting of a covalent bond, a $C_2$ alkenyl group, a halogenated $C_2$ alkenyl group, a $CH_2$ group, a $C(CX_3)_2$ group wherein X is a halogen, viz. fluoride, chloride, iodide and bromide or hydrogen, a CO group, an O atom, a S atom, a $SO_2$ group, a $Si(R)_2$ group where R is a $C_{1-3}$ alkyl group, a $C_{1-3}$ halogenated alkyl, or a N(R) group wherein R is as previously defined and further wherein F is in a position either meta or para to the carbonyl functionality or to the Y group;

B is selected from the group consisting of halogens, a $C_{1-3}$ alkyl group, a $C_{1-3}$ halogenated alkyl, phenyl, or substituted phenyl wherein the substituents on the phenyl ring include halogens, $C_{1-3}$ alkyls, $C_{1-3}$ halogenated alkyls and combinations thereof;

n is an integer from 0 to 4;

z is an integer from 0 to 3;

A is selected from the group consisting of hydrogen, halogen, $C_{1-3}$ alkyls, $C_{1-3}$ halogenated alkyls, nitro, cyano, thioalkyls of $C_{1-3}$, alkoxy groups of OR wherein R is as previously defined, aryl or substituted aryl such as halogenated aryl, $C_{1-9}$ alkyl esters, $C_{1-12}$ aryl esters and substituted derivatives thereof, $C_{1-12}$ aryl amides and substituted derivatives thereof;

p is an integer from 0 to 3, and wherein when p is greater than 1, the linking group between benzyl or substituted benzyl groups is F;

q is an integer from 1 to 3, and wherein when q is greater than 1, the linking group between benzyl or substituted benzyl groups is F;

r is an integer from 0 to 3, and wherein when p is greater than 1, the linking group between benzyl or substituted benzyl groups is F; and

Y is selected from the group consisting of O and NH.

In a preferred embodiment, r and q will be one, and at least one of the biphenyl ring systems will be substituted in the 2 and 2' positions, thereby rendering the repeating unit of the polyamides and polyesters as shown in general formula (II):

wherein all groups are as previously defined, with the further limitation that F is a covalent linking bond in a para orientation to either the carbonyl or to the Y group and m is an integer from 0 to 3, preferably from 0 to 2 and further wherein x and y are integers from 0 to 1, with the provision that x and y cannot both be 0.

In a more preferred embodiment of the invention, both of the biphenyl ring systems will be substituted in the 2 and 2' positions, thereby rendering the repeating unit of the polyamides and polyesters as shown in general formula (III):

wherein all substituents are as defined previously and m is an integer from 0 to 2.

In a most preferred embodiment of the invention, the biphenyl ring systems will each have a single pair of substituents thereupon, thereby rendering the repeating unit of the polyamides and polyesters as shown in general formula (IV):

While the discussion has focused on polyamides and polyesters, there is no need to limit the invention to such. In fact, the class of polymers which includes poly(amide-imides) and poly(ester-imides) would equally be envisioned to perform in a satisfactory manner. Specifically, the poly(amide-imides) which are included within the scope of this invention are the reaction product of a diacid and a diamine or of a diacid and a diol thereby forming the polyamide or polyester repeat unit shown in general formula (I)

(I)

wherein all groups are as defined previously, and the reaction product of a dianhydride and a diamine thereby forming the polyimide repeat unit either as shown in general formula (V)

(V)

wherein all groups are as defined previously and further wherein

G is selected from the representative and illustrative group consisting of a covalent bond or linking bond, a $CH_2$ group, a $C(CX_3)_2$ group wherein X is a halogen, viz. fluoride, chloride, iodide and bromide or hydrogen, a CO group, an O atom, a S atom, a $SO_2$ group, a $Si(R)_2$ group where R is a $C_{1-3}$ alkyl group, a $C_{1-3}$ halogenated alkyl, or a N(R) group wherein R is as previously defined and further wherein G is in a position either γ or δ to a carbonyl functionality;

or the reaction product of a dianhydride and a diamine thereby forming the polyimide repeat unit shown in general formula (VI)

(VI)

wherein $R^1$ is is a substituent selected independently from the group consisting of H, phenyl, alkylated phenyl wherein the alkyl group is selected from $C_{1-20}$, halogenated phenyl, $C_{1-20}$ alkyl and $C_{1-20}$ halogenated alkyl.

In a preferred embodiment, r and q will be one, and at least one of the biphenyl ring systems will be substituted in the 2 and 2' positions, thereby rendering the repeating unit of the polyamides and polyesters as shown in general formula (II):

(II)

wherein all groups are as previously defined, with the further limitation that F is a covalent linking bond in a para orientation to either the carbonyl or to the Y group and m is an integer from 0 to 3, preferably from 0 to 2 and further wherein x and y are integers from 0 to 1, with the provision that x and y cannot both be 0, and wherein at least one of the biphenyl ring systems will be substituted in the 2 and 2' positions, thereby rendering the repeating unit of the polyimide repeat unit as shown in general formula (VII)

(VII)

with the same limitations on x and y.

In a more preferred embodiment of the invention, both of the biphenyl ring systems will be substituted in the 2 and 2' positions, thereby rendering the repeating unit of the polyamides and polyesters as shown in general formula (III):

(III)

wherein all substituents are as defined previously and wherein the polyimide repeat unit is substituted in the 2 and 2' positions thereby rendering the general formula (VIII)

(VIII)

In a most preferred embodiment of the invention, the biphenyl ring systems will each have a single pair of substituents thereupon, thereby rendering the repeating unit of the polyamides and polyesters as shown in general formula (IV):

and wherein the polyimide repeat unit is as shown in general formula (IX)

EXAMPLES

The invention will be better understood by reference to the following illustrative and non-limiting representative examples which show the preparation of rigid rod polymers which are soluble in organic solvents.

EXAMPLE #1

Preparation of Homopolyamide of 2,2'-Diiodo-4,4'-biphenyldicarbonyl Chloride and 2,2'-bis(Trifluoromethyl)-4,4'-diaminobiphenyl The following quantitites of reactants were added to a 100 ml, four-necked flask, equipped with a mechanical stirrer, nitrogen inlet tube and $CaCl_2$ drying tube: 2.49 g of LiCl; 0.9616 g (3.0 mmol) of 2,2'-bis(trifluoromethyl)-4,4'-diaminobiphenyl; 30 ml of NMP; and 35 ml of tetramethylurea. The mixture was stirred at 40° C. until all of the solid material dissolved. The solution was then cooled to −5° C. and 1.5927 g (3.0 mmol) of 2,2'-diiodo-4,4'-biphenyldicarbonyl chloride was added to the solution. The mixture was stirred at 0° C. for 1 hr with subsequent warming to 75° C. This temperature was maintained for 18 hr. The solution was cooled to ambient temperature and poured into 1 L of ice water. The resulting polyamide was filtered, washed twice with water, followed by a methanol wash and final drying at 90° C. for 18 hours.

EXAMPLE #2

Preparation of Homopolyamide of 2,2'-bis(Trifluoromethyl)-4,4'-biphenyldicarbonyl Chloride and 2,2'-Dibromo-4,4'-diaminobiphenyl The following quantitites of reactants were added to a 100 ml, four-necked flask, equipped with a mechanical stirrer, nitrogen inlet tube and $CaCl_2$ drying tube: 2.40 g of LiCl; 1.1630 g (3.4 mmol) of 2,2'-dibromo-4,4'-diaminobiphenyl; 30 ml of NMP; and 30 ml of tetramethylurea. The mixture was stirred at 40° C. until all of the solid material dissolved. The solution was then cooled to −5° C. and 1.4114 g (3.4 mmol) of 2,2'-bis(trifluoromethyl)-4,4'-biphenyldicarbonyl chloride was added to the solution. The mixture was stirred at 0° C. for 1 hr with subsequent warming to 75° C. This temperature was maintained for 18 hr. The solution was cooled to ambient temperature and poured into 1 L of ice water. The resulting polyamide was filtered, washed twice with water, followed by a methanol wash and final drying at 90° C. for 18 hours.

EXAMPLE #3

Preparation of 2-Bromo-5-methoxybenzoic Acid

To a three-necked flask equipped with a mechanical stirrer and condenser, 100 g of anisic acid and 600 ml of glacial acetic acid were added. A solution of 106 g of bromine in 300 ml of acetic acid was added, followed by the addition of water. The mixture was heated to boiling and allowed to cool. Approximately 130 g of 2-bromo-5-methoxybenzoic acid was obtained as fine needle crystals.

EXAMPLE #4

Preparation of 4,4'-Dimethoxydiphenic Acid

A solution of 130 g of 2-bromo-5-methoxybenzoic acid, 400 ml of methanol, and 9 ml of sulfuric acid was heated at reflux for 4 hours. Rotary evaporation was used to remove the methanol from the system. Ether was used to dissolve the oily residue and the resulting solution was washed with water and dried with magnesium sulfate. The residual ether was evaporated on a rotary evaporator to obtain an oily-white powder-like compound, which was dissolved in 100 ml of NMP. The solution was added to a 500 ml three-necked flask, equipped with a mechanical stirrer and condenser and containing 60 g of activated copper bronze. The mixture was heated at reflux for 4 hours and filtered hot. After the filate was allowed to cool, it was poured into a large quantity of water resulting in a black precipitate. The precipitate was dissolved in 500 ml of a 5N NaOH aqueous solution and heated at reflux for 6 hours, followed by filtration and neutralization with HCl. The precipitate that formed was collected by filtration and recryatallized from a ethanol/water mixture containing active charcoal to afford 60 g of 4,4'-dimethoxydiphenic acid.

EXAMPLE #5

Preparation of 4,4'-Dihydroxydiphenic Acid

The following reactants, 9.06 g of 4,4'-dimethoxydiphenic acid, 100 ml of glacial acetic acid and 50 g of 48% HBr were heated at reflux for 12 hours. After most of the solvent had been distilled off, water was added and the solution heated to dissolve the solid residue. The solution was decolorized twice using active charcoal and cooled to yield 7.5 g of white 4,4'-dihydroxydiphenic acid.

EXAMPLE #6

Preparation of 2,2'-bis(Phenyl Carboxamide)biphenyl-4,4'-diol 4,4'-Dihydroxydiphenic acid (5.56 g) was dissolved in 20 ml of acetic anhydride containing a few drops of sulfuric acid and heated at 60° C. for 30 minutes. The resulting solution was poured into 300 ml of water to afford a white precipitate, which was filtered, dried and used without further purification. The 4,4'-diacetoxydiphenic acid was heated with 40 ml of thionyl chloride and a few drops of DMF at reflux for 6 hours. The thionyl chloride was distilled off to obtain an oily product to which was added 50 ml of chloroform, 8 g of pyridine and 10 g of aniline. After the solution was stirred at ambient temperature for 8 hours, 200 ml of chloroform was added. The resulting solution was washed twice with water and dried with $MgSO_4$. The chloroform was removed on a rotary evaporator and the oily product was heated at reflux with 50 ml of a 2N NaOH aqueous solution. The alkaline solution was neutralized with HCl. The precipitate that formed was collected, dried and recrystallized from methanol to afford ~5 g of 2,2'-bis(phenyl carboxamide)biphenyl-4,4'-diol.

EXAMPLE #7

Preparation of Homopolyester of 2,2'-bis(Trifluoromethyl)-4,4'-biphenyldicarbonyl Chloride and 2,2'-bis(Phenyl Carboxamide)biphenyl-4,4'-diol To a 100 ml three-necked flask equipped with a mechanical stirrer and a nitrogen inlet, were added: 1.5256 g (3.59 mmol) of 2,2'-bis(phenyl carboxamide)biphenyl-4,4'-diol, 1.4920 g (3.59 mmol) of 2,2'-bis(trifluoromethyl)-4,4'-biphenyldicarbonyl chloride, 30 ml of 1,1',2,2'-tetrachloroethane and 2 ml of pyridine under nitrogen. The solution was stirred and heated at 100° C. for 24 hours. The solution was cooled to room temperature and poured into 500 ml of methanol. The resulting fibrous precipitate was collected by filtration and reprecipitated from chloroform with methanol, with one additional reprecipitation from DMF with water.

Specifically, Table I illustrates the wide variety of rigid rod polymers and copolymers that can be used to prepare with negative birefringent films without the need of having to resort to either uniaxial or biaxial stretching to achieve the necessary orientation for birefringence. The preparative techniques described in Examples #1 and #2 can be used for the first four entries in the table, and the preparative techniques described in Examples #3–7 can be used for the last entry in the table.

TABLE I

Negative Birefringent Films

| Repeat Unit | $n_\parallel$ | $n_\perp$ | $\Delta n$ |
|---|---|---|---|
| (structure 1) | 1.574 | 1.506 | 0.068 |
| (structure 2) | 1.633 | 1.566 | 0.077 |
| (structure 3) | 1.635 | 1.578 | 0.057 |
| (structure 4) | 1.658 | 1.595 | 0.063 |
| (structure 5) | 1.609 | 1.574 | 0.035 |

DISCUSSION

While broad generalities, associated with structural effects on solubility are impossible, the majority of approaches have included: (1) incorporation of flexible or non-symmetrical, thermally-stable linkages in the backbone; (2) the introduction of large polar or non-polar substituents along the polymer backbone; and (3) the disruption of symmetry and recurrence regularity through the polymer backbone. The use of substitution in the 2 and 2' positions results in twisted polymer backbones that do not pack well in the solid state.

Additionally, the making of films is also well-known in the art, and for example, would include the preparative steps of preparing an approximately 2–12 weight percent solution of one of the polyimides in a solvent which is filtered, and a thin film cast onto a substrate with for example, a doctors knife, and the solvent allowed to evaporate, or by a spin coating technique at between 500–2,000 rpm. It is appreciated that other techniques are known in the art.

Typical effective solvents used in the above film-making process would include at least phenolics, and preferably polar aprotic solvents, and most preferably ketones and ethers. The list provided is merely illustrative of a great many other solvents which are applicable to the instant invention.

The film is typically dried under reduced pressure for one hour at ~80° C., ramped to ~100° C. for an additional two hours, followed by heating the sample at ~150° C. for an additional five hours. It is well-known in the art that the times and temperatures used in the above illustrative example are dependent upon the composition of the synthesized rigid rod polyester, polyamide, poly(ester-imide) or poly(amide-imide) and the conditions would be adjusted accordingly.

Liquid Crystal Compensator

Figure 1:
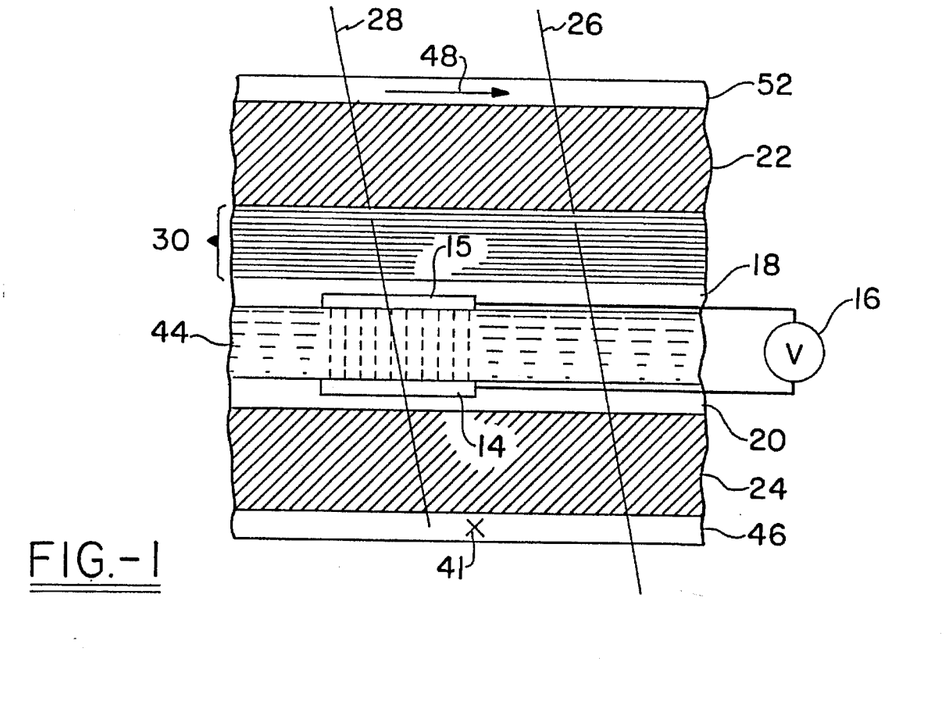
FIG. 1 is a cross-sectional schematic side view of a twisted nematic, transmissive-type liquid crystal display.

FIG. 1 is a cross-sectional schematic side view of a twisted nematic, transmissive type normally white liquid crystal display (LCD) constructed according to the teachings of U.S. Pat. No. 5,196,953, which is hereinby fully incorporated by reference. The display includes a polarizer layer 52, and an analyzer layer 46, between which is positioned a liquid crystal layer 44, consisting of a liquid crystal material in the nematic phase. The polarizer and the analyzer, as is indicated by the symbols 48 (representing a polarization direction in the plane of the drawing) and 41 (representing a polarization direction orthogonal to the plane of the drawing), are oriented with their polarization directions at 90° to one another, as is the case for a normally white display. A first transparent electrode 15 and a second transparent electrode 14 are positioned adjacent to opposite surfaces of the liquid crystal layer so that a voltage can be applied, by means of a voltage source 16, across the liquid crystal layer. The liquid crystal layer is in addition sandwiched between a pair of glass plates 18 and 20. The inner surfaces of the glass plates 18 and 20, which are proximate to the liquid crystal layer 44, are physically treated, as by buffing. Substrates 22 and 24 provide support structure for the aforementioned layers of the display.

As is well-known in the LCD art, when the material of the liquid crystal layer 44 is in the nematic phase and the inner surfaces of the plates 18 and 20 (the surfaces adjacent to the layer 44) are buffed and oriented with their buffed directions perpendicular, the director n of the liquid crystal material, absent any applied electrical voltage, will tend to align with the buffing direction in the regions of the layer proximate each of the plates 18 to the second major surface adjacent to the plate 20. Consequently, in the absence of an applied electric field, the direction of polarization of incoming polarized light will be rotated by 90° in travelling through the liquid crystal layer. When the glass plates and the liquid crystal layer are placed between crossed polarizers, such as the polarizer 48 and the analyzer 41, light polarized by the polarizer 48 and traversing the display, as exemplified by the light ray 26, will thus be aligned with the polarization direction of the analyzer 41 and therefore will pass through the analyzer. When a sufficient voltage is applied to the electrodes 18 and 20, however, the applied electric field causes the director of the liquid crystal material to tend to align parallel to the field. With the liquid crystal material in this state, light passed by the polarizer 48, as illustrated by the light ray 28, will be extinguished by the analyzer 41. Thus an energized pair of electrodes will produce a dark region of the display, while light passing through regions of the display which are not subject to an applied field will produce illuminated regions. As is well-known in the LCD display art, an appropriate pattern of electrodes, activated in selected combinations, can be utilized in this manner to display alphanumeric or graphic information.

A multilayer thin film compensator 30 is positioned in the display between the polarizer layer and the analyzer layer to enhance the viewing properties of a liquid crystal display over a wide range of viewing angles. The compensator includes a first series of layers having a first refractive index which alternate with a second series of layers having a second refractive index. The values of the first and second refractive indices, as well as the thicknesses of the layers in the first and the second series, are chosen such that the phase retardation of the multilayer is equal in magnitude but opposite in sign to the phase retardation of the liquid crystal layer. An enlarged view of the multilayer 30 is depicted in a cross-sectional side view in FIG. 2. This view shows a first series 32, 34, 36 . . . of layers having a first thickness $d_1$ and a second series 38, 40, 42 . . . of layers having a second thickness $d_2$. As those skilled in the art of optical thin films will appreciate, in order to effectively illustrate the concept of this invention, the thicknesses of the layers are exaggerated relative to the dimensions of an actual multilayer, as indicated by the dashed lines in the middle of the multilayer.

Figure 2:
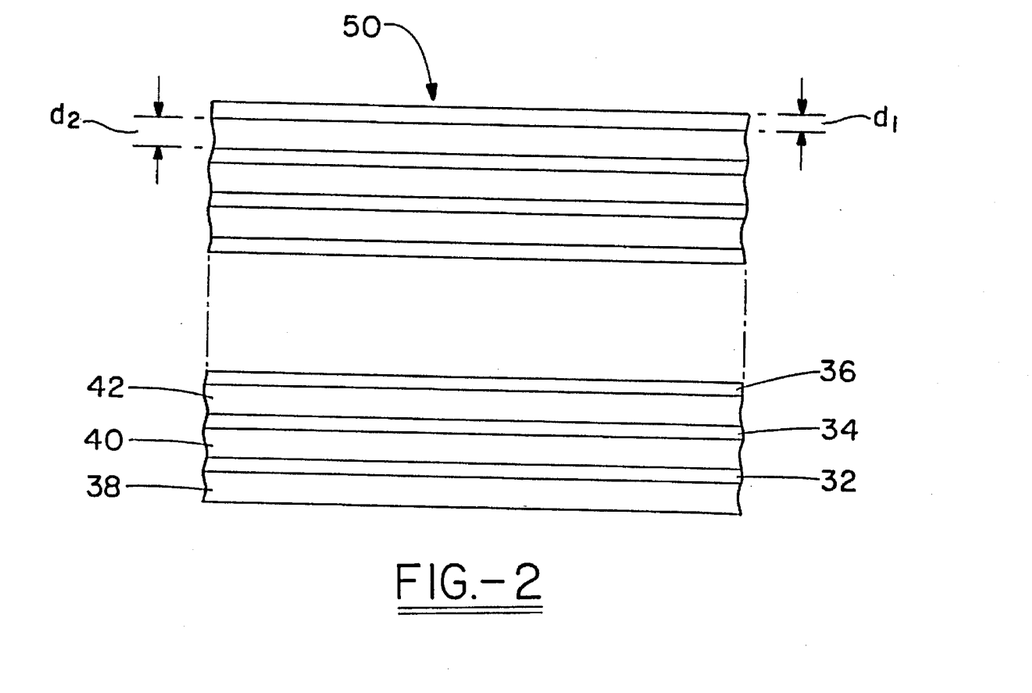
FIG. 2 is an enlarged view of the multilayer portion of the display depicted in FIG. 1.

Although the preferred embodiment illustrated here includes a multilayer compensator having two series of alternating layers comprising a first and a second optical material, those skilled in the art will recognize that the concept of a multilayer compensator applies as well to more complex multilayers including periodic layer structures of three or more materials, as well as multilayers in which the different layers of a particular material vary in thickness. Furthermore, the inventive concept is applicable to reflective as well as transmissive type liquid crystal displays.

What has heretofore not been recognized is that within compensator 30, the composition of the negative birefringent thin film layer can be the polymers of the instant invention, which can be custom-tailored to a desired negative birefringent value, and do not need to resort to the use of stretching to achieve the desired orientation, and additionally need not be comprised of an inorganic birefringent crystal, such as sapphire.

Another type of liquid crystal display which can benefit from this invention is the supertwist nematic cell, which exhibits voltage response characteristics allowing it to be addressed by simple multiplexing, thereby avoiding the expense and manufacturing difficulty associated with active matrix addressing. The supertwist configuration is achieved by doping the nematic liquid crystal material with a chiral additive which gives the cell 270° of total twist. Supertwist nematic cells are typically used in the normally black configuration, often employing the compensation techniques described above for normally black displays. Such cells, however, can also be operated in the nominally white mode and such normally white supertwist displays would also benefit from the addition of the multilayer compensator of this invention for field of view enhancement. Moreover, the compensation scheme of this invention is broadly applicable to any liquid crystal display which employs a homeotropically aligned state as part of its operation. Other types of liquid crystal displays, such as for example, ferroelectric, can be improved with this invention by acquiring a wider field of view in the aligned state which exhibits C-axis symmetry.

Figure 3:
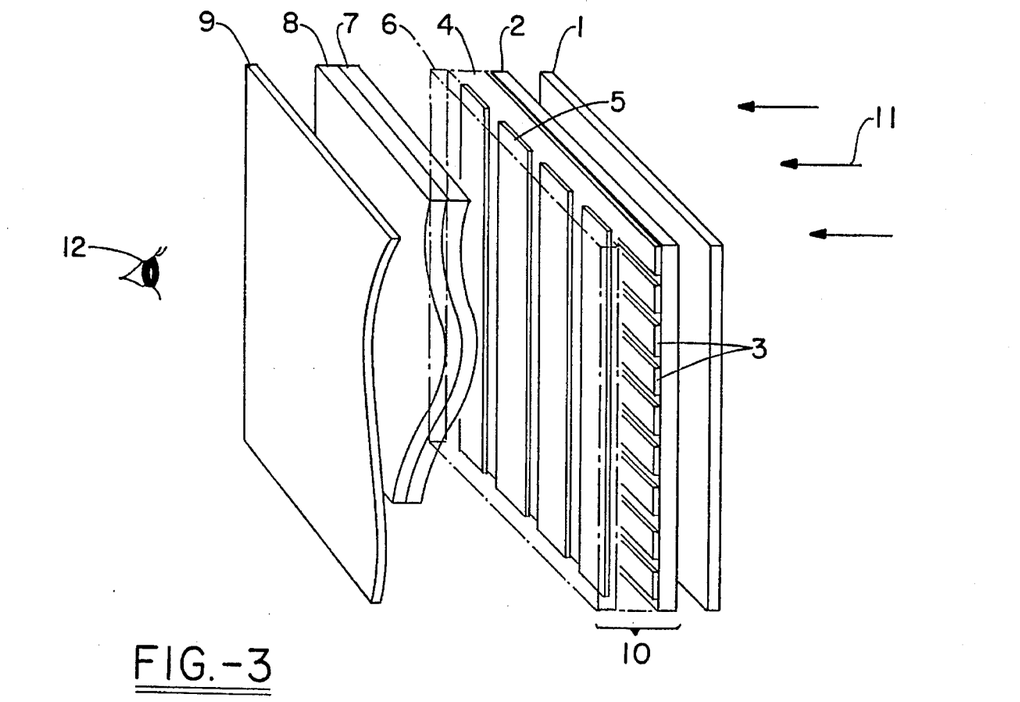
FIG. 3 is a perspective view of an alternative liquid crystal display.

In an alternative embodiment of this invention, FIG. 3 shows a perspective view of a liquid crystal display (LCD) constructed according to the teachings of U.S. Pat. No. 5,138,474, which is hereinby fully incorporated by reference. The display has a structure that includes a liquid crystal cell 10 and films 7,8 having positive and negative intrinsic birefringence values respectively, and are held between two sheets of polarizing sheets 1,9 in an opposed configuration. Additionally liquid crystal cell 10 includes two sheets of substrates 2,6, two transparent electrodes 3,5, and a liquid crystal layer 4 held between the electrodes, and the films interposed between the liquid crystal cell and the polarizing sheet 9 which is provided on the side of an observer.

Once again, as previously, the negative intrinsic birefringent thin film layer need not be at least one uniaxially stretched film of a polymer having a negative intrinsic birefringence. Rather, the negative birefringent thin film layer can be the polymers of the instant invention, which can be custom-tailored to a desired negative birefringent value, and do not need to resort to the use of stretching to achieve the desired orientation.

While this invention has focused on active matrix displays, there is no need to limit the invention to such. In fact, the invention is equally applicable to liquid crystal displays which have both active and passive display areas, the active areas typically presented by selective energization of dichroic or other liquid crystal, and the passive areas being created by a mask. One such example of a display cell having both active and passive areas is that shown in U.S. Pat. No. 5,130,827, to Litton Systems, Inc., which is hereinby fully incorporated by reference. Another such illustration of active and passive matrix components can be found in U.S. Pat. No. 5,128,782, which is also hereinby fully incorporated by reference. Displays which incorporate fully passive display areas are also a part of this invention.

Figure 4:
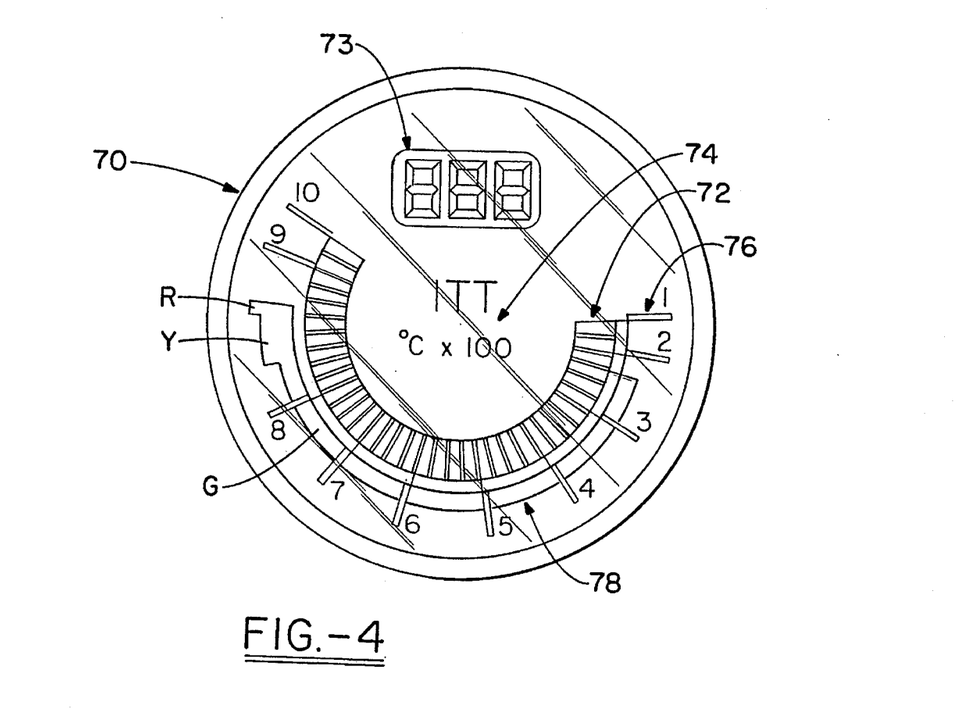
FIG. 4 shows a display with both active and passive display areas.

As discussed in U.S. Pat. No. 5,130,827, and shown in FIG. 4, a LCD with passive and active display areas is generally indicated by the reference numeral 70. The display includes an arcuate fixed element bar graph section 72 and a digital readout section 73, both of which are active matrix displays. The display further includes a parameter identification indicia 74, parameter units of measurement indicia 76 and bar indicia 78, all of which are passive. The particular display shown gives an indication of engine Inlet Turbine Temperature ("ITT") in °C. It will be understood that as the temperature changes, both the arcuate bar graph section 72 and the digital readout section 73 will change as required in order to give an accurate indication of temperature. The passive display portions 74, 76, and 78 do not change. Both the active portions 72 and 73 and passive portions 74, 76, and 78 of the display are illuminated by a rear light source 111, best seen in FIG. 7.

Figure 5:
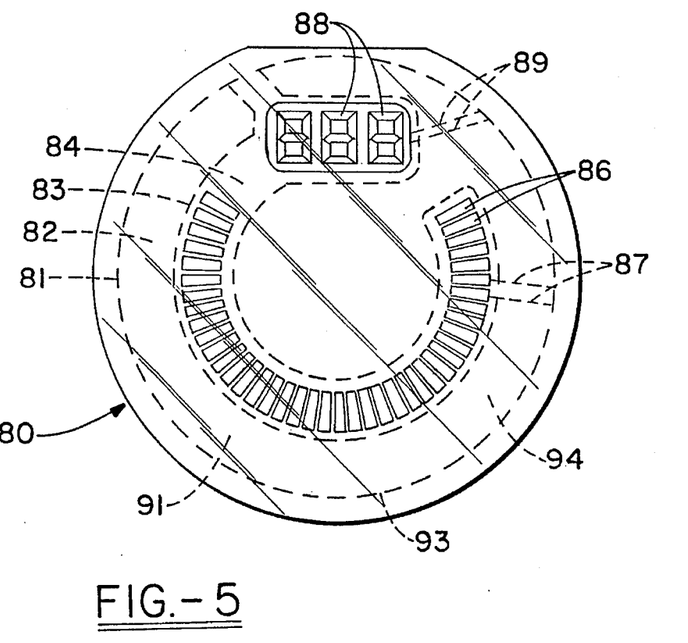
FIG. 5 shows a liquid crystal cell used in the display of FIG. 4.

In FIG. 5, an LCD cell is generally designated by the reference numeral 80. As well known in the art, the cell comprises a front glass plate 81 and a rear glass plate 82, best seen in FIG. 7. The plates 81 and 82 are spaced from one another and a seal bead 83 between the two plates forms a closed cavity 84. The cavity 84 is filled with a dichroic liquid crystal mixture and a plurality of electrodes 86 are arranged in an arcuate bar graph pattern while a second plurality of electrodes 88 are arranged in three FIG. 8 patterns. In use, the electrodes 86 are energized by means of traces 87 to give an arcuate bar graph readout of ITT, and the electrodes 88 are energized by means of traces 89 to give a numerical digital readout of ITT. The dichroic liquid is confined to the cavity 84 and creates an active area which is substantially less than the total area of the display.

The remaining portion of the display is a passive area 91 which is a substantial portion of the total area of the display. The passive area can be defined as that area of the display which is free of dichroic liquid. A second seal bead 93 is provided around the periphery of the display to secure the front and rear glass plates 81 and 82 together in order to provide a second cavity 94. It may be desirable in certain instances to fill the second cavity 94 with an index matching fluid to provide a display which is uniform in appearance both in the region of the index matching fluid and in the region of the two seal beads 83 and 93 which are often transparent. The use of an indexing matching fluid in the second cavity 94 is optional, however, and may be omitted if desired. In an alternate embodiment, the second cavity 94 may be filled with a colored light transmissive fluid to impart a color to the passive portion of the display.

Figure 6:
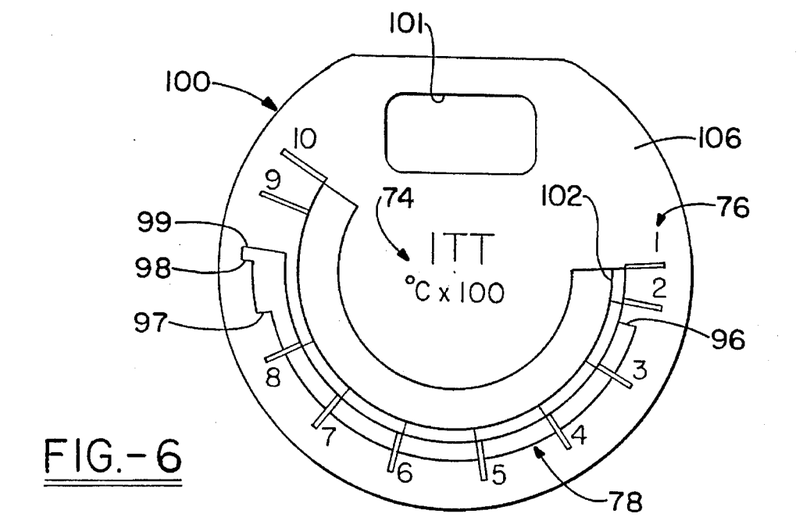
FIG. 6 shows a mask which is used in conjunction with the liquid crystal cell of FIG. 5.

FIG. 6 shows a mask generally designated by the reference numeral 100 which may be used with the LCD cell of FIG. 5. The mask comprises a rectangular cutout 101, an arcuate cutout 102, the indicia markings 74, 76, and 78, and an opaque background portion 106. The cutouts 101 and 102 are positioned to be in registration with the FIG. 5 elements 88 and the arcuate bar graph elements 86, respectively, of the LCD cell 80 shown in FIG. 7, when the mask 100 is placed against the front glass of the cell. The indicia markings 74, 76, and 78 are in registration with the passive area of the display beyond the perimeter of the closed cavity 84. Although some or all of the traces 87 and 89 may be in registration with the indicia markings 74, 76, and 78 of the mask, the traces are transparent as well known in the art; and accordingly, light from the rear light source 111 is able to pass through the passive area of the display and illuminate the indicia portions 74, 76, and 78. The indicia of the mask may be left clear or colored as desired. As an example, the numerical indicia 76 and the parameter identification indicia 74 may be white, the bar indicia 78 between points 96 and 97 may be green followed by thicker yellow indicia between points 97 and 98 and thicker red indicia between points 98 and 99. The opaque background area 106 of the mask may be black or any color desired as long as contrast is provided with the indicia portions 74, 76, and 78.

Figure 7:
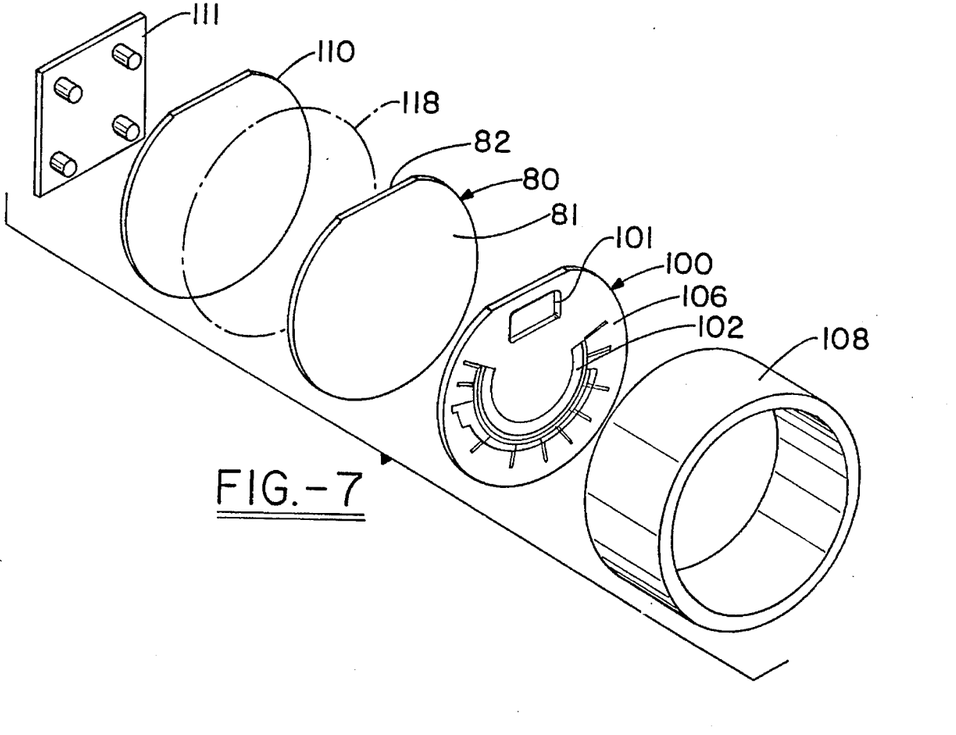
FIG. 7 is an exploded perspective view of the various components of a liquid crystal display (LCD)
Figure 8:
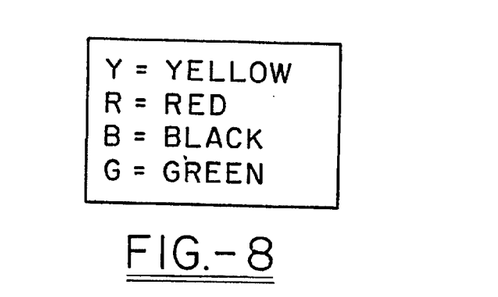
FIG. 8 is a color chart for the colors indicated by legend in FIGS. 4, 5, 6 and 7.

FIG. 7 is an exploded perspective view of an LCD dial indicator which has been removed from the housing 108. The mask 100 is positioned adjacent the front glass 81 of the LCD cell 80, and a transflector 110 is positioned adjacent the rear glass 82. The transflector 110 acts as a light diffuser for the LCD cell 80 in either a reflective mode in which light entering from the front of the LCD is reflected back through the LCD, or in a passive mode in which the transflector 110 is a diffuser for one or more lamps 111 positioned behind the transflector.

Although the mask 100 is shown positioned on the front surface of the LCD 80, it may also be positioned on the rear surface of the LCD between the display and the transflector 110 as shown by the phantom outline 118. In either position, the mask blocks light from the transflector 110 in those regions 106 which are opaque and allows light to pass through the indicia portions 74, 76, and 78 and through the cutout portions 101 and 102. The light from the transflector 110 which appears in the cutouts 101 and 102 is additionally controlled by the dichroic liquid crystal contained within the central cavity 84. In this way the information appearing in the cutouts 101 and 102 may be changed while the information appearing in the indicia portions 74, 76, and 78 are unchangeable.

Through the use of the invention, the same arcuate bar graph electrodes 86 and digital numerical electrodes 88 may be used with different masks 100 in order to provide different parameter presentations.

The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A negative birefringent film prepared from a rigid rod polymer wherein the polymer is selected from the group consisting of polyamide, polyester, poly(amide-imide) and poly(ester-imide) for use in liquid crystal displays, the film having a negative birefringence of 0.001 to 0.2, wherein the negative birefringence of the film is determined by controlling the degree of in-plane orientation of the polymer by control of the backbone chain rigidity and linearity, the higher the rigidity and linearity of the polymer backbone, the larger the value of the negative birefringence of the polymer film, and wherein (A) when the polymer is selected from the group of polyamide and polyester, the polymer has a repeat unit of general formula (I):

where each

F is selected from the group consisting of a covalent bond, a $C_2$ alkenyl group, a halogenated $C_2$ alkenyl group, a $CH_2$ group, a $C(CX_3)_2$ group wherein X is a halogen or hydrogen, a CO group, an O atom, a S atom, a $SO_2$ group, a $Si(R)_2$ group where R is a $C_{1-3}$ alkyl group, a $C_{1-3}$ halogenated alkyl, or a N(R) group wherein R is as previously defined and further wherein F is in a position either meta or para to the carbonyl functionality or to the Y group;

B is selected from the group consisting of halogens, a $C_{1-3}$ alkyl group, a $C_{1-3}$ halogenated alkyl, phenyl, or substituted phenyl wherein the substituents on the phenyl ring are selected from the group consisting of halogens, $C_{1-3}$ alkyls, $C_{1-3}$ halogenated alkyls and combinations thereof;

n is an integer from 0 to 4;

z is an integer from 0 to 3;

A is selected from the group consisting of hydrogen, halogen, $C_{1-3}$ alkyls, $C_{1-3}$ halogenated alkyls, nitro, cyano, thioalkyls of $C_{1-3}$, alkoxy groups of OR wherein R is as previously defined, aryl, halogenated aryl, $C_{1-9}$ alkyl esters, $C_{1-12}$ aryl esters, and $C_{1-12}$ aryl amides;

p is an integer from 0 to 3;

q is an integer from 1 to 3;

r is an integer from 0 to 3; and

Y is selected from the group consisting of O and NH; and (B) wherein when the polymer is selected from the group consisting of poly(amide-imide) and poly(ester-imide), a polyamide component of the poly(amide-imide) which is the reaction product of a diacid and a diamine and a polyester component of the poly(ester-imide) which is the reaction product of a diacid and a diol, the polyamide and polyester components have a repeat unit as shown in general formula (I), and wherein a polyimide component is selected from the group consisting of

(1) the reaction product of a dianhydride and a diamine thereby forming the polyimide repeat unit shown in general formula (V)

and further wherein

G is selected from the group consisting of a covalent bond or linking bond, a $CH_2$ group, a $C(CX_3)_2$ group wherein X is as defined previously, a CO group, an O atom, a S atom, a $SO_2$ group, a $Si(R)_2$ group and a N(R) group where R is as defined previously, and further wherein G is in a position either γ or δ to a carbonyl functionality; and (2) the reaction product of a dianhydride and a diamine thereby forming the polyimide repeat unit shown in general formula (VI)

wherein $R^1$ is a substituent selected independently from the group consisting of H, phenyl, alkylated phenyl wherein the alkyl group is selected from $C_{1-20}$, halogenated phenyl, alkyl and $C_{1-20}$ halogenated alkyl.

2. The polymer of claim 1 wherein r and q are one, and at least one of the biphenyl ring systems is substituted in the 2 and 2' positions in relation to the covalent linking bond between the phenyl rings, thereby rendering the repeating unit as shown in general formula (II):

and wherein F is a covalent linking bond in a para orientation to either the carbonyl or to the Y group and m is an integer from 0 to 3, and further wherein x and y are integers from 0 to 1, with the provision that x and y cannot both be 0.

3. The polymer of claim 2 wherein m is an integer from 0 to 2.

4. The polymer of claim 3 wherein both of the biphenyl ring systems are substituted in the 2 and 2' positions in relation to the covalent linking bond between the phenyl rings, thereby rendering the repeating unit as shown in general formula (III)

5. The polymer of claim 4 wherein each biphenyl ring will have a single substituent in the 2 and 2' positions in relation to the covalent linking bond between the phenyl rings thereupon, thereby rendering the repeating unit of the polyamides and polyesters as shown in general formula (IV)

(IV)

6. The polymer of claim 1 wherein r and q are one for the polyamide and polyester components, and at least one of the biphenyl ring systems is substituted in the 2 and 2' positions in relation to the covalent linking bond between the phenyl rings, thereby rendering the repeating unit as shown in general formula (II):

(II)

and wherein F is a covalent linking bond in a para orientation to either the carbonyl or to the Y group and m is an integer from 0 to 3, and further wherein x and y are integers from 0 to 1, with the provision that x and y cannot both be 0 and wherein for the polyimide component, the at least one of the biphenyl ring systems will be substituted in the 2 and 2' positions, thereby rendering the repeating unit of the polyimide repeat unit as shown in general formula (VII)

(VII)

with the same limitations on x and y.

7. The polymer of claim 6 wherein m is an integer from 0 to 2.

8. The polymer of claim 7 wherein both of the biphenyl ring systems for the polyamide and polyester components are substituted in the 2 and 2' positions in relation to the covalent linking bond between the phenyl rings, thereby rendering the repeating unit as shown in general formula (III)

(III)

and wherein the polyimide component repeat unit is substituted in the 2 and 2' positions thereby rendering the general formula (VIII)

(VIII)

9. The polymer of claim 8 wherein each biphenyl ring of the polyester and polyamide components has a single substituent thereupon, thereby rendering the repeating unit as shown in general formula (IV)

(IV)

and wherein the polyimide component repeat unit is substituted in the 2 and 2' positions in relation to the covalent linking bond between the phenyl rings thereby rendering the repeating unit as shown in general formula (IX)

(IX)

* * * * *